(12) United States Patent
Barre et al.

(10) Patent No.: US 8,562,027 B2
(45) Date of Patent: Oct. 22, 2013

(54) CONNECTION DEVICE FOR FUEL TUBING OF AN AIRCRAFT

(75) Inventors: Thomas Barre, Toulouse (FR);
Matthieu Biteau, Toulouse (FR);
Olivier Bourbon, Aucamville (FR);
Alexis Courpet, Fronton (FR);
Jean-Marc Roques, Toulouse (FR);
Cedric Sable, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 13/458,186

(22) Filed: Apr. 27, 2012

(65) Prior Publication Data

US 2012/0286505 A1    Nov. 15, 2012

(30) Foreign Application Priority Data

May 9, 2011    (FR) ...................................... 11 53974

(51) Int. Cl.
*F16L 27/10*    (2006.01)

(52) U.S. Cl.
USPC .......................................... 285/223; 361/215

(58) Field of Classification Search
USPC .......... 285/223, 298, 339, 399; 361/215, 212, 361/220, 216, 218; 244/135 R
See application file for complete search history.

(56) References Cited

U.S. PATENT DOCUMENTS

| 2008/0078880 | A1* | 4/2008 | Petit ........................... 244/135 R |
| 2010/0001512 | A1  | 1/2010 | Breay et al. |
| 2010/0122749 | A1  | 5/2010 | Bouleti et al. |
| 2010/0226063 | A1  | 9/2010 | West et al. |
| 2012/0057267 | A1* | 3/2012 | Petit et al. ..................... 361/215 |

FOREIGN PATENT DOCUMENTS

| EP | 0 279 979 A1 | 8/1988 |
| EP | 2 189 702 A1 | 5/2010 |
| FR | 2 948 254    | 1/2011 |

OTHER PUBLICATIONS

French Preliminary Search Report and Written Opinion issued Nov. 3, 2011, in French 1153974, filed May 9, 2011 (with English Translation of Categories of Cited Documents).

* cited by examiner

*Primary Examiner* — Aaron Dunwoody
(74) *Attorney, Agent, or Firm* — Oblon, Spivak, McClelland, Maier & Neustadt, L.L.P.

(57) ABSTRACT

A fuel piping connection device for aircraft includes a male end fitting and a female end fitting that are configured to engage one another. The male and female end fittings are made of a resistive material that is an insulating material loaded with conducting fibers. Each of the male and female end fittings is configured to be bonded to a radial outer wall at an extremity of a respective tube in the fuel piping or to a radial outer wall at an extremity of a respective piping connector. Each of the male and female end fittings includes an inwardly projecting shoulder configured to engage with an axial end surface of the respective tube in the fuel piping or with an axial end surface of the respective piping connector.

18 Claims, 3 Drawing Sheets

CONNECTION DEVICE FOR FUEL TUBING OF AN AIRCRAFT

BACKGROUND OF THE INVENTION

I. Field of the Invention

This invention relates to the protection of piping and in particular of fuel piping against lightning in aircrafts with a composite structure and to achieve this, it proposes a connection device for aircrafts fuel piping that comprises end fittings with suitable resistivity.

II. Description of Related Art

In aircrafts, the path of fuel tubing is complex and requires many changes of direction; this requires making connection parts between tubes with diverse geometry.

In addition, in the case of aircrafts with fuselage and wings of composite material, the conductivity of the structure is much lower than that of the paths of metal tubes and because of this, a very large part of lightning currents pass through these paths.

In theory, degradation of these paths may occur when there is excessive current.

To limit the passage of lightning currents, parts that are insulating or more resistive than the structure must be added to the piping that makes up these paths.

It is, nevertheless, necessary to evacuate the electrostatic charges that can accumulate in the piping.

This is all the more necessary when the piping is located in a fuel tank.

Current metal piping in particular is fitted with welded or crimped, male or female metal connectors and comprises bonding tabs welded onto the tube.

In a composite structure airplane, for example with a carbon fiber structure, the piping is usually manufactured either in highly resistive materials or metal (Aluminum, Titanium, Stainless Steel). The connectors are generally manufactured in aluminum.

Current composite piping is fitted with bonded metal connectors that comprise metallization tabs, which are bonded or added when the tube is manufactured. The metal connector also comprises metallization tabs i.e. tabs for receiving a grounding metal braid called "metallization braid".

For machined or molded connectors, the male or female end fittings are machined.

Existing solutions to solve the problems involve adding insulating elements between 2 pieces of piping and grounding the insulated sections.

It is known to cut off the electrical path along the piping and, in particular, document EP 0 297 990 A1 proposes cutting the electrical path by making tubes at least partly from electrically insulating material; document EP 2 034 228 A1 describes the use of insulating insertions between the tubes; document EP 0 217 313 describes insulating tubes one from the other and grounding some tubes.

In summary, to respond to the constraints of eliminating electrostatic charges while limiting the passage of the lightning currents, metal tubing is not resistive enough and must be sectioned, thermoplastic materials alone are too resistive which limits the allowable length of piping.

To solve the above problem, document FR2 948 254 A1 by the applicant provides for alternating metal connection parts and insulating connection parts. This configuration requires connectors between tubes with complex geometry; in addition, these connectors must be made in different materials.

BRIEF SUMMARY OF THE INVENTION

The present invention proposes a simple solution which applies more specifically to routing piping carrying kerosene and located in a fuel tank, which is usually located in the wings.

To achieve this, this invention proposes a device for connecting aircraft fuel piping that comprises male/female end fittings made of highly resistive material, designed to be bonded at the extremities of tubes in the piping and/or of piping connectors.

The highly resistive material is preferably an insulating material loaded with conductive fibers.

According to a particular embodiment, the insulating material is a thermoplastic material and in particular Polyetheretherketone (PEEK).

Advantageously, the conductive fibers are fibers of a few nanometers to 5 mm.

According to a first embodiment, the conductive fibers are carbon fibers.

According to an alternate embodiment, the conductive fibers are miscellaneous short fibers including in particular 0.1 to 10% carbon and/or graphite and/or Polytetrafluoroethylene (PTFE).

Preferably, the resistivity of the conductive fibers is between 1 and 100 $\Omega \cdot mm^2/m$.

According to an advantageous aspect of the invention, the bonding of the end fittings on the tubes and connectors is a bonding using an adhesive designed to evacuate electrostatic charges.

The adhesive is advantageously an epoxy/silver adhesive with a resistivity of 1000 to 4000 $\mu\Omega \cdot cm$, which ensures an electrical contact between the end fittings and the tubes and connectors.

According to a particular embodiment of the invention, at least some of the end fittings comprise metallization tabs to receive grounding braids connected to the tubes.

The length of the protection from gliding arcs on female end-fittings is preferably greater than 25 mm.

Advantageously, the male end-fittings have a groove to receive an o-ring and the inner diameter of a skirt of the female end-fittings receiving said male end-fittings is designed to achieve tightness at the o-ring.

According to a particular embodiment, at least some of the end-fittings are insulating end-fittings, end-fittings made of PEEK loaded with glass fibers in particular.

The invention applies to aircrafts comprising tubing fitted with connector devices such as described above.

BRIEF DESCRIPTION OF THE DRAWINGS

Other features and advantages of the invention will become apparent in reading the following description of non-limiting examples of realization of the invention with reference to the drawings, which show.

DETAILED DESCRIPTION OF THE INVENTION

Figure 1A:
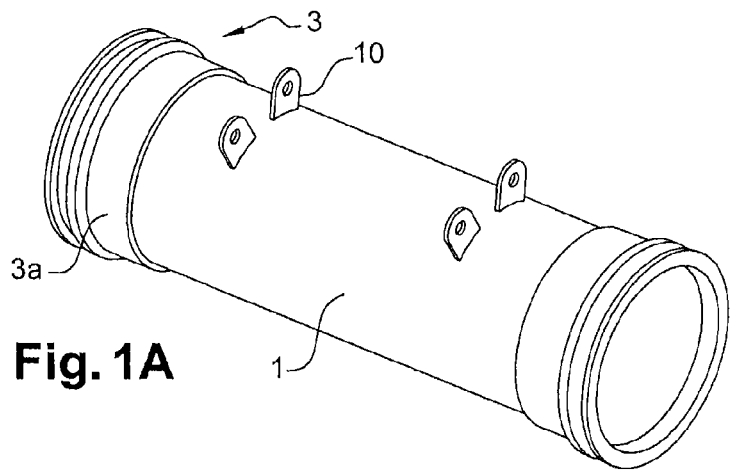
in FIGS. 1A and 1B: perspective and side views respectively of a tube comprising two male end-fittings according to the device of the invention.

The example in FIG. 1A represents a tube 1 of piping fitted with end-fittings 3 bonded onto the tube, according to the invention. Here, the end-fittings bonded onto the extremities of the tube are male end-fittings 3.

A material able to be molded, resistant to hydrocarbons and having a comparable fire resistance to aluminum is Polyetheretherketone (PEEK). This plastic material will be preferred here.

To make the highly resistive end-fittings, the PEEK is, according to the example, loaded with short fibers with reduced resistivity—resistivity of 1 to 50 $\Omega \cdot mm^2/m$—to confer its mechanical strength to it and to make it sufficiently conductive to eliminate electrostatic charges.

For the fibers, it is possible to choose, in particular, carbon fibers, since this material's volumetric resistivity is 40 $\Omega \cdot mm2/m$ while the volumetric resistivity of graphite, another possible loading, is 8 $\Omega \cdot mm2/m$.

The short fibers are fibers of a few nanometers to about 5 mm.

Since the resistivity and mechanical properties of carbon fibers are suitable, they will be preferred and the loading percentage is of the order of 10 to 40% for carbon, with a value of 30%±10% being particularly suited.

By dosing the concentration of short fibers, in particular of carbon fibers, the desired conductivity/resistivity of the high resistivity end-fittings is obtained as well as the performance under the pressures encountered in aircraft fuel lines.

It is also possible to mix the fibers; a dosing may in particular be 10% carbon, 10% graphite, 10% Polytetrafluoroethylene (PTFE) with relative variations between these elements.

Figure 1B:
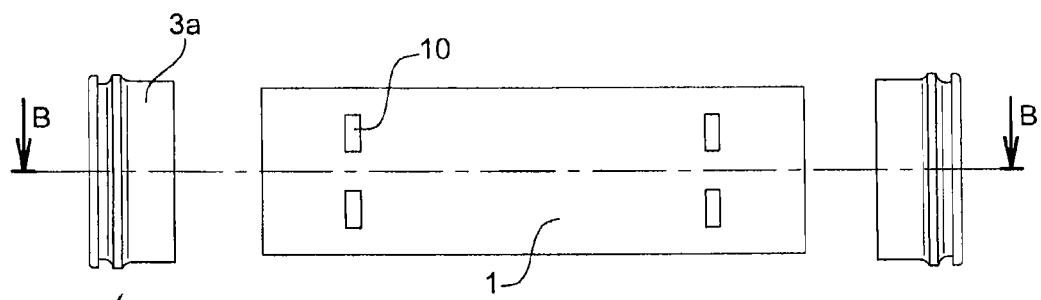

The end-fittings are inserted longitudinally in the tube, as shown in FIG. 1B, and comprise a sleeve 3a that is bonded on the outer wall of the tube.

According to the example shown, the male end-fittings are bonded on the tubes of the piping and the male end-fittings are bonded on the connectors; this allows fastening the piping to the structure of the aircraft and/or to realize changes in direction of the piping.

It is of course possible to invert the assembly to have the male end-fittings on the connectors and the female end-fittings on the tubes.

Figure 2:
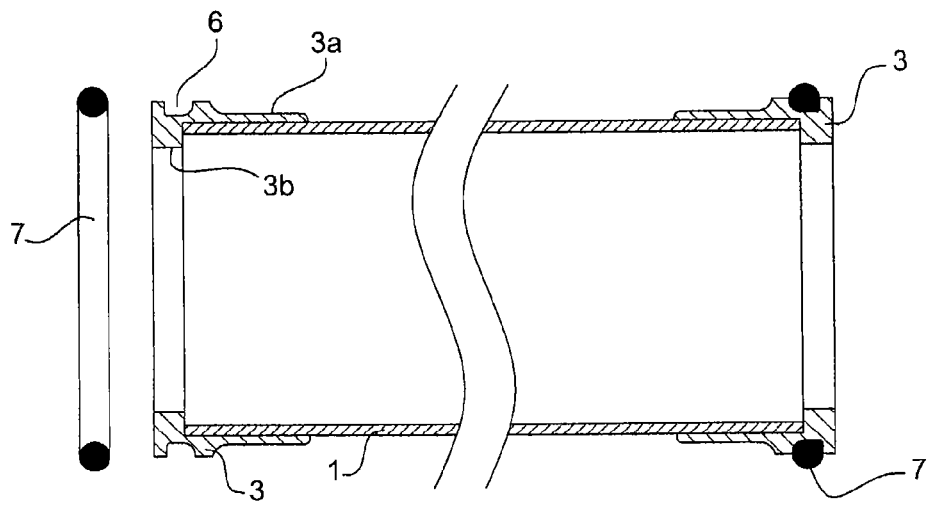
in FIG. 2: a cross-section view of the tube in FIG. 1.

According to FIG. 2, the end-fittings 3 also comprise an annular shoulder 3b that stops the penetration of the end-fitting on the tube.

The male end-fittings 3 have a groove 6 that receives an o-ring 7.

Figure 3A:
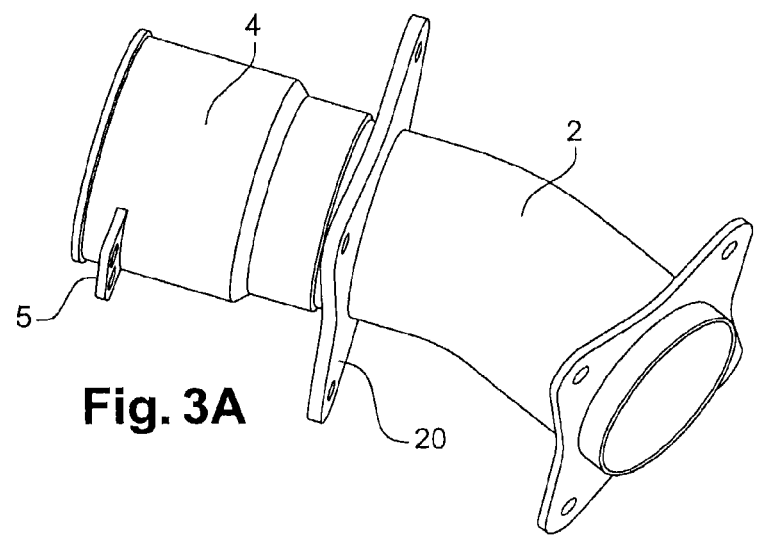
in FIGS. 3A and 3B: perspective and side views respectively of a connector fitted with a female end-fitting according to the device of the invention.

The invention combines male end-fittings and female end-fitting to make the connections and FIG. 3A shows a female end-fitting 4 installed on a connector 2, for example an elbow connector 2 or a bulkhead through-connector.

The connector is a metal or a highly resistive connector.

Figure 3B:
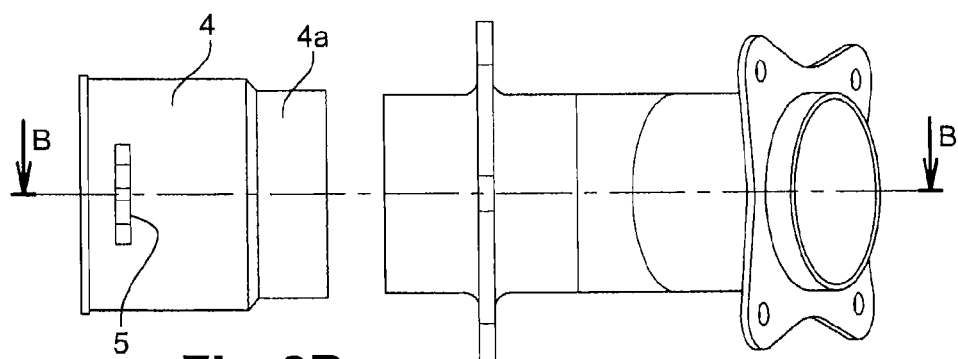
Figure 4:
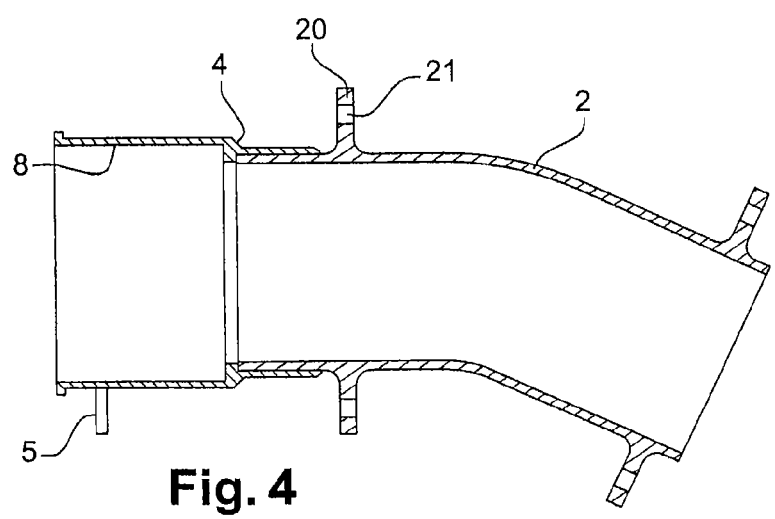
in FIG. 4: a side cutaway view of the connector in FIG. 3.

According to FIG. 3B, the female end-fitting is positioned on the extremity of the connector by means of a sleeve 4a, whose inner diameter is compatible with bonding the end-fitting on the outer diameter of the termination of the connector.

The sleeve is designed to offer a suitable surface for bonding.

The female end-fitting comprises, as an extension of the sleeve, a skirt 8 whose diameter is larger than the sleeve 4a.

The skirt is fitted on the male end-fitting and its inner diameter is designed to provide tightness at the o-ring 7 fitted on the male end-fitting 3.

Even though FIGS. 1A and 3A show male end-fittings on a tube and a female end-fitting on a connector, it is possible, according to the invention, to fit male or female end-fittings on the tubes and connectors or to mix on a single tube a male end-fitting and a female end-fitting.

By adapting their sizes, the end-fittings according to the invention thus allow the use of existing standards (seals, etc.) and allow sealing and adjusting tolerances by means of the joint with o-ring between tube and connector or tube and tube.

According to FIG. 3A, the female end-fitting comprises mounting tabs 5 designed to connect a ground braid and to conduct the current generated by the electrostatic charges on the tubing towards this structure. The elbow connector 2 comprises mounting tabs 20 on the structure of the aircraft and it is possible in the case of an insulating connector to connect the ground braid at the connector mounting on the structure.

Changes of section are in addition possible by adapting the respective diameters of the female skirt and sleeve and by changing the thickness of the male sleeves.

The length of the female end-fittings 4 and in particular of the skirt 8 is determined so as to prevent the formation of electric arcs between two tube segments in case of lightning.

The bonding of the end-fittings on the metal or highly resistive tubes and on metal or highly resistive connectors is preferably based on epoxy/silver bonding with a resistivity of 1000 to 4000 $\Omega \cdot cm$.

It is intended to ensure a sufficient electrical contact to evacuate the electrostatic charges that accumulate on the end-fittings, tubes and connectors.

The device according to the invention provides protection from lightning currents and the evacuation of electrostatic currents, while being adaptable to different types of composite/metal environments.

The highly resistive end-fittings according to the invention thus provide insulation against lightning currents while allowing electrostatic charges that accumulate on the piping by friction of the liquid to be evacuated.

To avoid the electrical gliding arcs (phenomenon of arcs that glide over a surface), the length of the end-fittings is greater than 25 mm.

To make the idea more concrete, a realization constraint is that the chosen minimum distance between 2 separate metal parts is 10 mm, in order to avoid the electrical arcing in air at a tension of around 10 kilovolts.

By using highly resistive end-fittings, the device according to the invention allows the realization of tubing that is protected against lightning and that evacuates electrostatic charges, whether the pipes are made of metal, composites or plastics.

It is very well suited for tubing that passes, at least in part, through kerosene tanks.

It offers a gain in productivity by the removing welding, crimping and machining operations, by removing the bonding of the metallization tabs on the composite tubes and by eliminating expensive high resistivity piping.

By controlling the proportion of short fibers in the PEEK, it is possible to modify the conductivity/resistivity of the material and its performance with regard to forces and its mass.

Because of this, the proposed solution is tailored to the specific requirements of each aircraft.

Figure 5A:
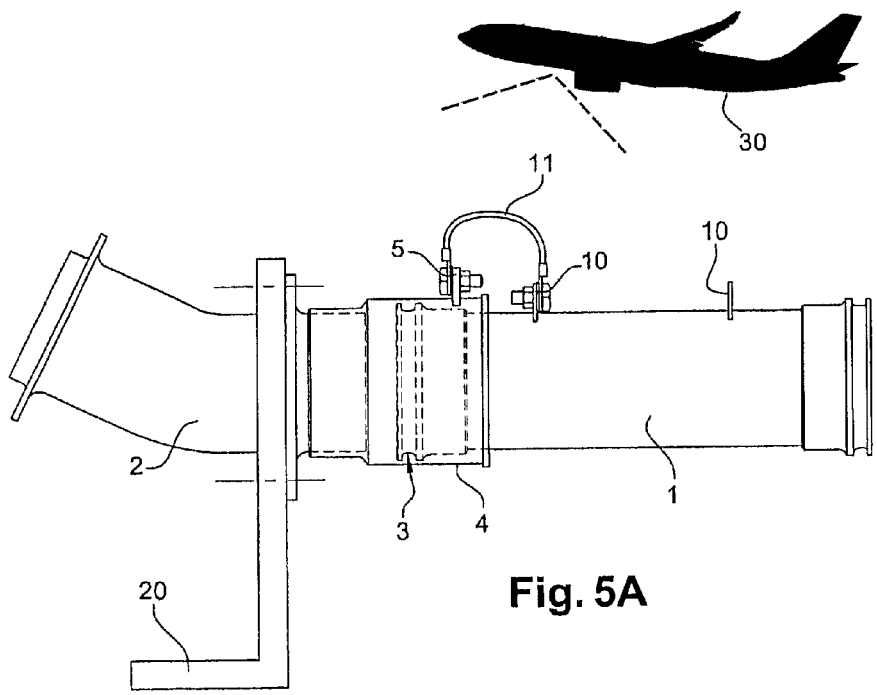
in FIGS. 5A and 5B: side and perspective views respectively of an electrical connection of tubing fitted with the device according to the invention on the structure of the aircraft.

FIG. 5A shows a side view of a connection device using the female end-fittings according to the invention.

The male end-fittings 3 are mounted at the extremities of the tube 1; the female end-fitting 4 is slipped on one of the male end-fittings.

The female end-fitting 4, represented in transparency, is fitted and bonded with its terminator 4a on a conductive connector 2.

It comprises metallization tabs 5, fastening tabs and tabs for making contact with ground braid 11 terminating lugs 12 connected to the metallization tabs 10 of tube 1.

The connector 2, here an elbow-type connector, is fixed on a mounting 20, itself fastened on a structure or tank of an aircraft 30.

This connector can be, in particular, a metal connector or a connector which itself is highly resistive.

The mounting provides the grounding of the connector 2 and, because of the conductivity of the end-fitting 4 and of the braids 11, the electrostatic charges accumulated on the tube 1 are evacuated towards the structure through the end-fitting, the connector and the mounting.

Figure 5B:
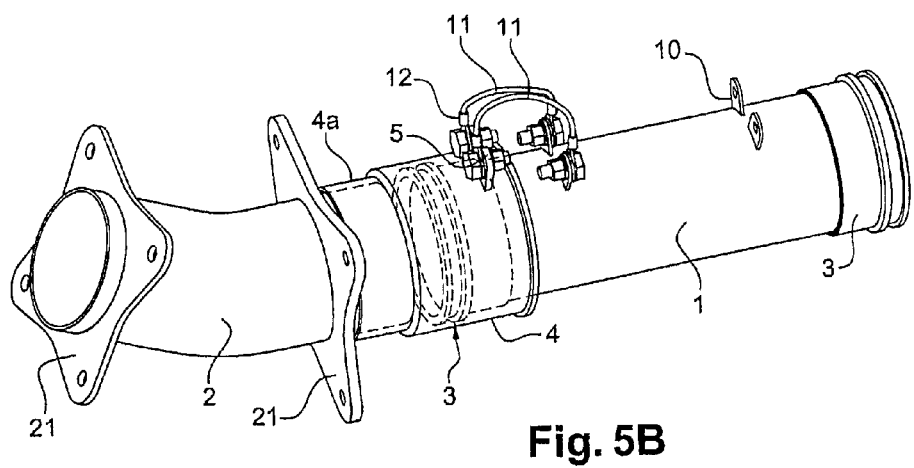

FIG. 5B shows in perspective the connection of the tube on the elbow connector 2 by means of the male and female end-fittings 3, 4, such that the mounting holes 21 of the connector on the mounting of FIG. 5A can be seen.

A non-negligible advantage is to keep the connector 2 unmodified in its elbow part; this allows appropriate connectors suited to the desired curvature and resistant to any torsion forces of the piping to be realized and the end-fitting standardized by the invention are subject to the pressure forces of the liquid content in the piping.

According to a particular embodiment, some end-fittings may be insulators, for example in the case where cutting a potential electrical path is required.

In addition, the invention means that connectors that meet curvature constraints and that are resistant to possible torsion forces of the piping can be kept, while the end-fittings are adapted to the pressure forces of the liquid content in the piping.

The invention claimed is:

1. A fuel piping connection device for aircraft, wherein said connection device comprises:
    a male end fitting and a female end fitting that are configured to engage one another, the male and female end fittings are made of a resistive material that is an insulating material loaded with conducting fibers,
    each of the male and female end fittings is configured to be bonded to a radial outer wall at an extremity of a respective tube in the fuel piping or to a radial outer wall at an extremity of a respective piping connector, and
    each of the male and female end fittings includes an inwardly projecting shoulder configured to engage with an axial end surface of the respective tube in the fuel piping or with an axial end surface of the respective piping connector.

2. A fuel piping connection device for aircraft according to claim 1, wherein the insulating material is a thermoplastic material.

3. A fuel piping connection device for aircraft according to claim 1, wherein the conductive fibers are fibers of a few nanometers to 5 mm.

4. A fuel piping connection device for aircraft according to claim 1, wherein the conductive fibers are carbon fibers.

5. A fuel piping connection device for aircraft according to claim 1, wherein the conductive fibers are short various fibers including 0.1 to 10% of at least one of carbon and graphite and Polytetrafluoroethylene (PTFE).

6. A fuel piping connection device for aircraft according to claim 1, wherein the resistivity of the conductive fibers is between 1 and 100 $\Omega \cdot mm^2/m$.

7. A fuel piping connection device for aircraft according to claim 1, wherein a bonding of each of the male and female end fittings on the respective tube in the fuel piping or on the respective piping connector is a bonding including an adhesive configured to evacuate electrostatic charges.

8. A fuel piping connection device for aircraft according to claim 7, wherein the adhesive is an epoxy/silver adhesive with a resistivity of 1000 to 4000 $\mu\Omega \cdot cm$, which ensures an electrical contact between the male and female end fittings and the respective tube in the fuel piping or the respective piping connector.

9. A fuel piping connection device for aircraft according to claim 1, wherein at least one of the male and female end fittings includes metallization tabs to receive grounding braids connected to the tube in the fuel piping.

10. A fuel piping connection device for aircraft according to claim 1, wherein a length of protection from gliding arcs on the female end fitting is greater than 25 mm.

11. A fuel piping connection device for aircraft according to claim 1, wherein the male end fitting includes a groove that receives an o-ring and an inner diameter of a skirt of the female end fitting receiving said male end fitting is configured to achieve tightness at the o-ring.

12. A fuel piping connection device for aircraft according to claim 1, wherein at least one of the male and female end fittings is made of Polyetheretherketone (PEEK) loaded with glass fibers.

13. An aircraft comprising tubing fitted with fuel piping connection devices according to claim 1.

14. A fuel piping connection device for aircraft according to claim 1, wherein in a state in which the male end fitting and the female end fitting are engaged, the engaged male and female end fittings separate metal parts of at least one of the respective tube in the fuel piping and the respective piping connector by at least 10 mm.

15. A fuel piping connection device for aircraft according to claim 1, wherein the female end fitting includes a sleeve and a skirt, the sleeve is configured to be bonded to the radial outer wall at the extremity of the respective tube in the fuel piping or to the radial outer wall at the extremity of the respective piping connector, and the skirt is configured to receive the male end fitting so that an entirety of the male end fitting is axially positioned between the inwardly projecting shoulder of the female end fitting and an axial end surface of the female end fitting that surrounds the respective tube in the fuel piping or the respective piping connector bonded to the male end fitting, wherein a diameter of the skirt is greater than a diameter of the sleeve.

16. A fuel piping connection device for aircraft according to claim 15, wherein the inwardly projecting shoulder of the female end fitting is at a diameter transition point between the sleeve and the skirt.

17. A fuel piping connection device for aircraft according to claim 2, wherein the thermoplastic material is Polyetheretherketone (PEEK).

18. A fuel piping connection device for aircraft according to claim 4, wherein a loading percentage of the carbon fibers is in a range of 10 to 40%.

* * * * *